(12) United States Patent
Okuda et al.

(10) Patent No.: US 12,340,696 B2
(45) Date of Patent: Jun. 24, 2025

(54) PLATOONING SYSTEM

(71) Applicant: TOYOTA JIDOSHA KABUSHIKI KAISHA, Toyota (JP)

(72) Inventors: Koichi Okuda, Toyota (JP); Masafumi Yamamoto, Nagakute (JP); Yoshito Sekiguchi, Kariya (JP); Yuuki Makino, Aichi-gun (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 18/161,150

(22) Filed: Jan. 30, 2023

(65) Prior Publication Data

US 2023/0252901 A1 Aug. 10, 2023

(30) Foreign Application Priority Data

Feb. 4, 2022 (JP) .................................. 2022-016727

(51) Int. Cl.
*G08G 1/00* (2006.01)
*B60W 10/10* (2012.01)
*B60W 60/00* (2020.01)

(52) U.S. Cl.
CPC ............... *G08G 1/22* (2013.01); *B60W 10/10* (2013.01); *B60W 60/0025* (2020.02); *B60W 2510/10* (2013.01)

(58) Field of Classification Search
CPC .... G08G 1/22; B60W 10/10; B60W 60/0025; B60W 2510/10; B60W 30/165
See application file for complete search history.

(56) References Cited

U.S. PATENT DOCUMENTS

2019/0025857 A1* 1/2019 Luckevich ............. G05D 1/695
2021/0213948 A1* 7/2021 Lahti .................... B60W 30/162

FOREIGN PATENT DOCUMENTS

JP 2000303868 A * 10/2000

* cited by examiner

*Primary Examiner* — Aniss Chad
*Assistant Examiner* — Nikki Marie M Molina
(74) *Attorney, Agent, or Firm* — Oblon, McClelland, Maier & Neustadt, L.L.P.

(57) ABSTRACT

A platooning system executes automatic follow-up running in line with a predetermined intervehicle distance between adjacent vehicles from a leading vehicle, the platoon participating vehicles each comprising a driving force source, an automatic transmission capable of shifting to a plurality of gear stages each having a different gear ratio, and an in-vehicle control device automatically controlling output of the driving force source and the gear stages of the automatic transmission, the platooning system comprising a platoon control device connected via wireless communication to the platoon participating vehicles, for managing at least shifting of the automatic transmission, the platoon control device executing platoon shift control that shifts the automatic transmission via the in-vehicle control device in order from vehicles on tail side among the platoon participating vehicles in case of satisfying shift conditions previously defined to allow the driving force source to work in a proper working range.

8 Claims, 10 Drawing Sheets

|  | C1 | C2 | C3 | B1 | B2 | F1 |
|---|---|---|---|---|---|---|
| 1st | O |  |  |  | (O) | O |
| 2nd | O |  |  | O |  |  |
| 3rd | O | O |  |  |  |  |
| 4th |  | O |  | O |  |  |
| Rev |  |  | O |  | O |  |
| N |  |  |  |  |  |  |

(O: ENGAGED  BLANK: RELEASED)

| | GEAR STAGE | | | | | |
|---|---|---|---|---|---|---|
| 4-SPEED TRANSMISSION | 1 | 2 | | 3 | | 4 |
| 5-SPEED TRANSMISSION | 1 | 2 | | 3 | 4 | 5 |
| 6-SPEED TRANSMISSION | 1 | 2 | 3 | 4 | 5 | 6 |

PLATOONING SYSTEM

This application claims priority from Japanese Patent Application No. 2022-016727 filed on Feb. 4, 2022, the disclosure of which is herein incorporated by reference in its entirety.

BACKGROUND OF THE INVENTION

Field of the Invention

The present invention relates to a platooning system that manages at least shifting of an automatic transmission, for platoon participating vehicles including a leading vehicle and following vehicles.

Description of the Related Art

A platooning system has been proposed (a) for platoon participating vehicles including a leading vehicle and following vehicles executing automatic follow-up running in line, with a predetermined intervehicle distance between adjacent vehicles from the leading vehicle, (b) the platoon participating vehicles each comprising a driving force source, an automatic transmission capable of shifting to a plurality of gear stages each having a different gear ratio, and an in-vehicle control device automatically controlling output of the driving force source and the gear stages of the automatic transmission, (c) the platooning system comprising a platoon control device that manages shifting of the automatic transmission of each of the platoon participating vehicles. A device described in JP2000-303868A is an example thereof, the document describing a technique preventing the automatic transmission of the leading vehicle from having a gear ratio relatively greater than that of the following vehicles.

However, when shift control of the automatic transmission is separately performed for each of the platoon participating vehicles, variation may occur in the responsiveness of the driving force on a vehicle-by-vehicle basis depending on whether shifting has been executed or due to deviations in shift timing, whereupon the intervehicle distance between a vehicle with poor responsiveness and a preceding vehicle may become wide or the intervehicle distance between the vehicle with poor responsiveness and a succeeding vehicle may become narrow, resulting in a disordered platoon. For example, when a preceding vehicle is precedently shifted, which induces a margin in output control over the driving force source, leading to a higher driving force responsiveness, the intervehicle distance may widen due to delayed follow-up of the succeeding vehicle with relatively low driving force responsiveness.

SUMMARY OF THE INVENTION

The present invention was conceived against the background of the above circumstances. It is therefore an object of the present invention to restrain the intervehicle distances from varying to disturb a platoon due to differences in the driving force responsiveness caused by deviations in shift timing of the automatic transmissions of the platoon participating vehicles.

The object indicated above is achieved according to the following aspects of the present invention.

According to a first aspect of the invention, there is provided a platooning system comprising (a) platoon participating vehicles including a leading vehicle and following vehicles executing automatic follow-up running in line with a predetermined intervehicle distance between adjacent vehicles from the leading vehicle, (b) the platoon participating vehicles each comprising a driving force source, an automatic transmission capable of shifting to a plurality of gear stages each having a different gear ratio, and an in-vehicle control device automatically controlling output of the driving force source and the gear stages of the automatic transmission, (c) the platooning system comprising a platoon control device connected via wireless communication to the platoon participating vehicles for managing at least shifting of the automatic transmission, (d) the platoon control device executing platoon shift control that shifts the automatic transmission of each of the platoon participating vehicles via the in-vehicle control device in order of a vehicle position from a tail side in case of satisfying shift conditions previously defined to allow the driving force source to work in a proper working range.

According to a second aspect of the invention, in the platooning system of the first aspect of the invention, (a) the shift conditions used in the platoon shift control are defined based on running state including a drive demand amount, and (b) the platoon control device determines whether the shift conditions are satisfied, based on the running state of the leading vehicle of the platoon participating vehicles.

According to a third aspect of the invention, in the platooning system according to the first or second aspect of the invention, the platoon control device acquires transmission information related to the automatic transmission of each of the platoon participating vehicles, the platoon control device setting the shift conditions so that shifting is performed at the same timing even in case that the respective automatic transmissions have a different number of gear stages.

According to a fourth aspect of the invention, in the platooning system according to any one of the first through third aspects of the invention, (a) the shift conditions used in the platoon shift control are defined separately from shift conditions used in normal shift control that the respective in-vehicle control devices separately perform during solo running of the platoon participating vehicles, and (b) after completion of the platoon shift control and before return to the normal shift control, the in-vehicle control device limits shifting executed under the normal shift control, until predefined transition conditions are satisfied.

According to a fifth aspect of the invention, in the platooning system according to any one of the first through fourth aspects of the invention, (a) the platoon participating vehicles allow a vehicle with a continuously variable transmission to join the platoon participating vehicles as the following vehicle, and (b) the platoon control device acquires transmission information related to the continuously variable transmission and, in case that the platoon participating vehicles include a vehicle with the continuously variable transmission, excludes application of the platoon shift control to the vehicle.

According to a sixth aspect of the invention, in the platooning system according to any one of the first through fifth aspects of the invention, (a) the platoon participating vehicles allow a vehicle with a manual transmission to join the platoon participating vehicles as the following vehicle, and (b) the platoon control device acquires transmission information related to the manual transmission and manual transmission information for determining whether the manual transmission is shifting and, in case that the platoon participating vehicles include a vehicle with the manual transmission, interrupts shifting under the platoon shift control of the platoon participating vehicle with the automatic transmission while the manual transmission is shifting.

According to a seventh aspect of the invention, in the platooning system according to any one of the first through sixth aspects of the invention, in case that protective shifting is requested that shifts the automatic transmission for protecting each of the platoon participating vehicles, the in-vehicle control device executes the protective shifting with priority over the platoon shift control effected by the platoon control device.

According to an eighth aspect of the invention, in the platooning system according to any one of the first through seventh aspects of the invention, (a) the platoon participating vehicle each comprise a torque converter with a lockup clutch disposed between the driving force source and the automatic transmission, the in-vehicle control device automatically controlling working state of the lockup clutch, and (b) in case of satisfying predefined lockup clutch release conditions, the platoon control device executes, via the in-vehicle control device, platoon lockup control for switching the working state of the lockup clutch to released state in order from vehicles on tail side of the platoon participating vehicles.

Advantageous Effect of the Invention

In the platooning system of the invention, shifting of the shift unit of each of the platoon participating vehicles is executed in order from the tail side, among the platoon participating vehicles, and hence the shifting allows a margin in output control of the driving force sources for the platoon participating vehicles on the tail side, leading to higher driving force responsiveness, whereupon proper follow-up running becomes possible with the target intervehicle distance kept with respect to the preceding vehicle, consequently suppressing disturbance in the platoon when shifting the shift unit.

According to the second aspect of the invention, since it is determined whether the shift conditions of the platooning shift map are satisfied, based on the running state of the leading vehicle of the platoon participating vehicles, i.e., a vehicle having a greatest running air resistance and most quickly affected by, e.g., changes in the load surface gradient, the shift unit of each of the platoon participating vehicles is shifted rapidly correspondingly to the change in the demanded driving torque, thus enabling both the driving force performance and the target intervehicle distance to be kept.

According to the third aspect of the invention, since the platooning shift map is set so that shifting is performed at the same timing when the shift unit of each of the platoon participating vehicles has a different number of gear stages, there can be appropriately provided the effect of suppressing disturbance in the platoon arising from changes of the intervehicle distance caused by the difference in driving force responsiveness, by shifting the shift unit in order from the platoon participating vehicles on the tail side.

According to the fourth aspect of the invention, in the case where the platooning shift map used in platoon shift control is defined separately from the normal shift map for use in shift control separately performed by the shift control units during the solo running, shifting by normal shift control is limited until the predefined migration conditions are satisfied after completion of the platoon shift control and before return to the normal shift control, and therefore shifting is performed at the same time when leaving the platoon after the completion of the platooning for example, suppressing the occurrence of a feeling of sluggishness.

According to the fifth aspect of the invention, in the case where the platoon participating vehicles include a vehicle with a continuously variable transmission, application of the platoon shift control to the vehicle is excluded, thus, proper implementation of the platoon shift control can be ensured for the other platoon participating vehicles each having a stepped shift unit.

According to the sixth aspect of the invention, since in the case where the platoon participating vehicles include a vehicle with a manual transmission, shifting under platoon shift control for the other platoon participating vehicles each having the shift unit is interrupted while the manual transmission is shifting, proper implementation of the platoon shift control can be ensured irrespective of the presence of the platoon participating vehicle with the manual transmission. That is, if while the manual transmission is shifting, platoon shift control is executed for the platoon participating vehicles running anterior and posterior to the vehicle with the manual transmission, their respective driving force responsiveness may differ due to deviations in shift timing from the manual shifting, which may change the intervehicle distance and disturb the platoon. The platoon shift control is thus temporarily interrupted during shifting of the manual transmission.

According to the seventh aspect of the invention, in the case where protective shifting is requested that shifts the shift unit for the purpose of protecting the platoon participating vehicles, the protective shifting is executed with priority over the platoon shift control, the platoon participating vehicles are properly protected by the protective shifting. The protective shifting is, e.g., shifting for protecting the shift unit, etc. from rise in temperature of lubricant cooling them, or a shift for protecting the engine, the rotator MG, etc. as the driving force sources from overheating, etc.

According to the eighth aspect of the invention, since including the switching control putting the LU (lockup) clutch into the released state, the platoon lockup control is performed that switches the working state of the LU clutch in order from the vehicles on the tail side among the platoon participating vehicles, thus, upon switching to the released state of the LU clutch, the torque amplification effect by the torque converter is obtained from the platoon participating vehicles on the tail side. This allows a margin in output control of the driving force sources, leading to higher driving force responsiveness, whereupon proper follow-up running becomes possible with the target intervehicle distance kept with respect to the preceding vehicle, consequently suppressing disturbance in the platoon when switching the working state of the LU clutch. That is, if when switching the working state of the LU clutch to the released state, the LU clutch of the preceding vehicle is precedently released due to timing deviations, etc., then, the torque amplification effect by the torque converter brings about a margin in output control of the driving force sources, leading to higher driving force responsiveness, whereupon delay occurs in the follow-up of the following vehicles having relatively low driving force responsiveness, resulting in increased intervehicle distance, which may disturb the platoon.

DESCRIPTION OF THE PREFERRED EMBODIMENTS

Figure 1:
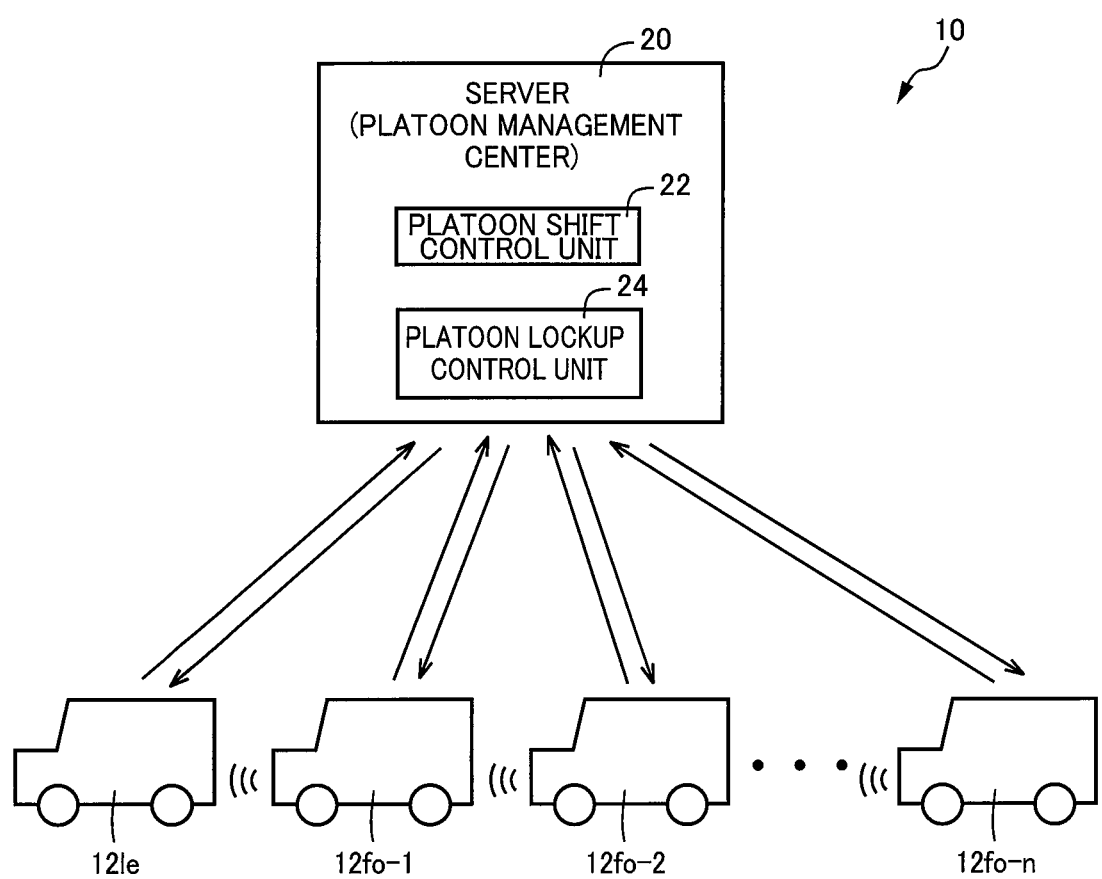
FIG. 1 is a schematic view explaining a basic configuration of a platooning system that is an embodiment of the present invention.

The platoon participating vehicles can be various types of vehicles that have hitherto been used, such as engine driven vehicles, electrically powered cars, or hybrid electromotive vehicles each having an engine and a rotator as driving force sources. The engine is an internal combustion engine such as a gasoline engine or a diesel engine. A proper rotator is a motor generator that can be selectively used as an electric motor or a generator. The motor generator functions as a driving force source by being used as the electric motor, whereas it can provide regenerative braking by use as the generator. The rotator may be an electric motor that cannot provide the generator function. If necessary, a hydrodynamic power transmission device such as a torque converter is disposed on a power transmission path between the driving force source and the automatic transmission. However, the hydrodynamic power transmission device may be left out depending on the driving force source, and instead, there may be disposed an electric differential unit with a planetary gear device and a rotator for differential control, a friction-engagement starting clutch, etc. The automatic transmission capable of shifting to a plurality of gear stages can be preferably a stepped transmission of, e.g., planetary gear type, biaxial meshing type, etc., but may be a continuously variable transmission of belt type, etc. having a stepwise controlled gear ratio like the stepped transmission.

The platoon control device can be disposed in, e.g., a head office, sales offices, or any other places of a transport company that manages platoon participating vehicles, but may be mounted on a platoon participating vehicle, with control functions for platoon shift control and platoon lockup control being built in the in-vehicle control device. Although the platoon participating vehicles are configured including, e.g., one leading vehicle and a plurality of following vehicles, they may consist of a total two vehicles i.e., one leading vehicle and one following vehicle. It is desirable that the platoon participating vehicle have a driver on board, but an unmanned platoon participating vehicle may be used if unmanned running is possible, such as the case of having an automatic steering system that allows running according to a predetermined running route. The platoon shift control by the platoon control device is configured to output shift commands so that shifting is performed in order from vehicles on the tail side of the platoon, based on, e.g., a running order previously defined. However, configuration may be such that shifting is performed in order from the vehicles on the tail side of the platoon, via vehicle-to-vehicle communications among the platoon participating vehicles, according to the shift commands from the platoon control device. In short, any control is acceptable as long as shifting is performed in order from vehicles on the tail side of the platoon according to the shift commands from the platoon control device. The same applies to the platoon lockup control of the lockup clutch.

The following vehicle has a function of follow-up running with a predetermined intervehicle distance. That is, the following vehicle figures out a drive demand amount necessary for performing follow-up running so that the intervehicle distance from the preceding vehicle is kept at a predefined target intervehicle distance, and controls the output of the driving force source to obtain the drive demand amount, to thereby execute the follow-up running control allowing follow-up running with the target intervehicle distance. It is desirable that in addition to the follow-up running control, the leading vehicle can execute autonomous running control allowing running at a predetermined target vehicle velocity, by calculating a drive demand amount necessary for running at a predefined target vehicle velocity and controlling the output of the driving force source to obtain the drive demand amount. The autonomous running control may be control for constant velocity running that runs at a constant target vehicle velocity, but may be control for automatically running while varying the vehicle velocity in accordance with target vehicle velocities that are sequentially variably set according to the running route. The following vehicle may also be capable of autonomous running control similar to the leading vehicle. That is, there is no need to functionally distinguish the leading vehicle from the following vehicle, and it is desirable to enable optional participation in a platoon as the leading vehicle or the following vehicle. The output control of the driving force source in the follow-up running control and the autonomous running control is desirably effected including a negative torque arising from, e.g., the engine brake or regenerative control of the rotator, and it is also possible to perform braking force control via the automatic braking system. The leading vehicle may run while controlling the output of the driving force source according to the driver's acceleration/deceleration operation. Although also in the leading vehicle, shifting of the automatic transmission is managed by the platoon control device, e.g., a guide vehicle or the like shifting the automatic transmission in accordance with the manual operation may be disposed in front of the leading vehicle.

Although the platoon participating vehicles may include plural types of vehicles having automatic transmissions whose number of gear stages differs, they may include only vehicles having one type of automatic transmissions whose number of gear stages is the same. In such a case, shift conditions for platoon shifting need not necessarily be set, and shift conditions for use in solo running may be applied as it is to the platoon shift control. Also regarding the platoon lockup control, release conditions for platoon lockup control may be set, but release conditions used in solo running may be applied intactly to the platoon lockup control. In the case where the shift conditions for platoon shift control are defined separately from the shift conditions used in normal shift control during solo running, after completion of the platoon shift control and before return to the normal shift control, it is desirable to limit shifting executed under normal shift control until predefined migration conditions are satisfied. However, if the gear stage at the time of completion of platoon shift control does not coincide with the gear stage under normal shift control, immediate shifting may be made to a gear stage defined by the normal shift control. Although the migration conditions are defined by, e.g., the elapsed time or the running distance after the completion of platooning, they may not be defined until shift determination is made according to the normal shift control with changes in the running state of the platoon participating vehicles. Although in the case where the platoon participating vehicles include a vehicle with a manual transmission, it is desirable to interrupt shifting under platoon shift control for the other platoon participating vehicles while the manual transmission is shifting, the shifting under platoon shift control for the other platoon participating vehicles may be continuously executed irrespective of whether the manual transmission is shifting.

Embodiment

An embodiment of the present invention will now be described in detail with reference to the drawings. In the embodiment below, the Figures are appropriately simplified or modified for explanation and do not necessarily correctly show shapes, dimension ratios, angles, etc. of parts.

FIG. 1 is a schematic view explaining a basic configuration of a platooning system 10 that is the embodiment of the present invention. The platooning system 10 of the embodiment is configured to include a plurality of platoon participating vehicles 12*le*, 12*fo*-1, 12*fo*-2, . . . , and 12*fo-n*, and a server 20 of a platoon management center. Such platooning is mainly performed on, e.g., freeways and other automobile-only roads. The platoon participating vehicle 12*le* is a leading vehicle of the platoon, while the platoon participating vehicles 12*fo*-1, 12*fo*-2, . . . , and 12*fo-n* are following vehicles that automatically follow the leading vehicle 12*le* in one line with a predetermined intervehicle distance, the reference numerals 12*fo*-1, 12*fo*-2, . . . , and 12*fo-n* being imparted to the following vehicles in order from the leading side. In description which follows, when the following vehicles 12*fo*-1, 12*fo*-2, . . . , and 12*fo-n* are not particularly distinguished from each other, they are referred to as following vehicle 12*fo*, and when the leading vehicle 12*le* and the following vehicle 12*fo* are not particularly distinguished from each other, they are referred to as platoon participating vehicles 12. The server 20 is an electronic control device such as a personal computer and is disposed in a head office, sales offices, etc. of a company to which the platoon participating vehicles 12 belong. However, it may be disposed in commercial facilities, etc.

Figure 2:
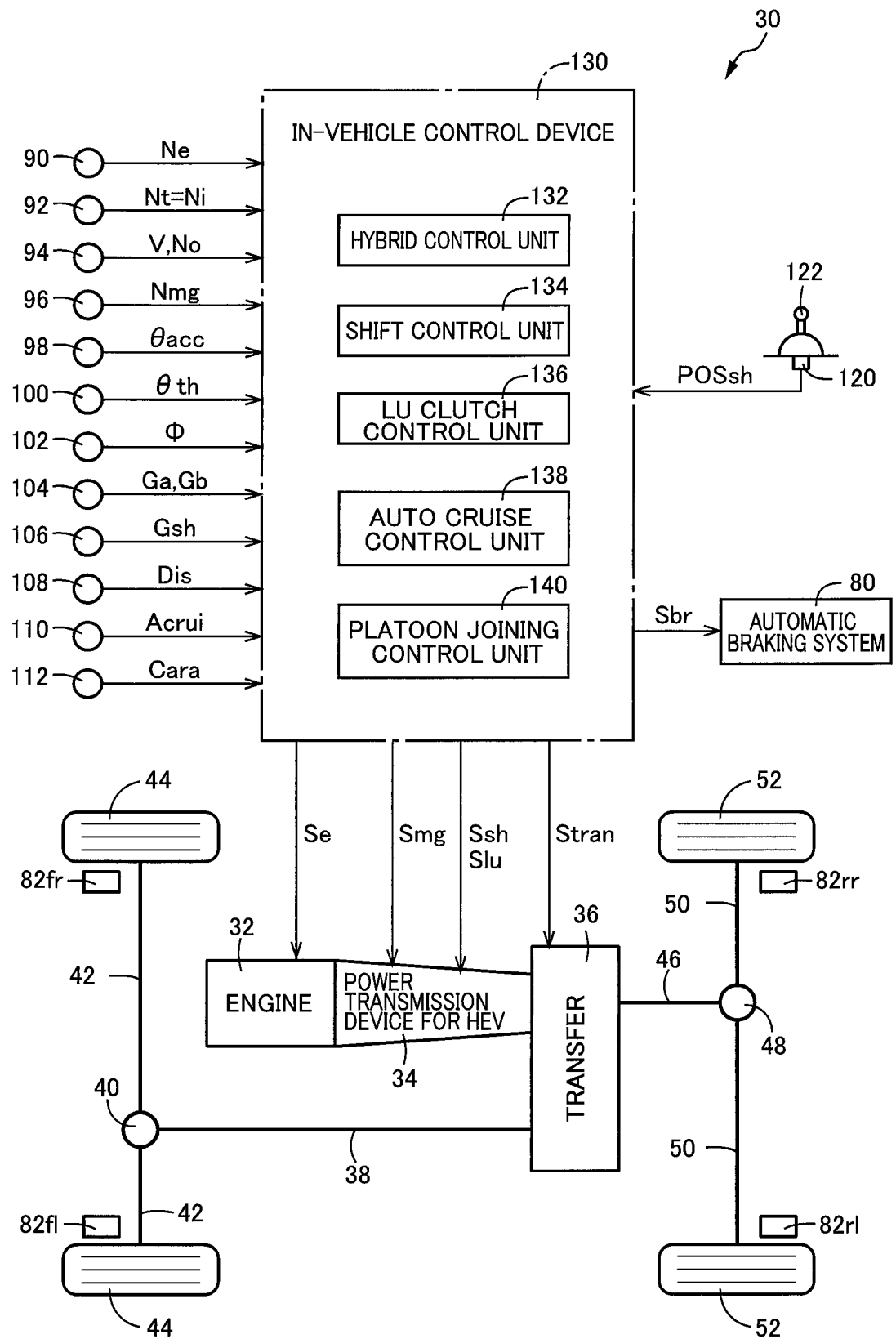
FIG. 2 is a diagram explaining an example of a vehicle that can be used as a platoon participating vehicle of FIG. 1, and is a diagram showing control functions for various controls and a control system, together with a schematic view of a drive system.

FIG. 2 is a diagram explaining an example of a vehicle 30 that can join a platoon as a platoon participating vehicle 12 of FIG. 1, and is a diagram showing control functions for various controls and a principal part of a control system, together with a schematic view of a drive system. The vehicle 30 is a normal vehicle capable of not only platooning but also solo running, and includes an in-vehicle control device 130. In the case where the vehicle 30 joins a platoon as the platoon participating vehicle 12, the in-vehicle control device 130 of each platoon participating vehicle 12 and the server 20 of the platoon management center are connected via a wireless communication network such as mobile phone network, wireless LAN network, or Internet so that various pieces of information can be transmitted and received. The in-vehicle control device 130 and the server 20 are each configured to include a so-called microcomputer having a CPU, a RAM, a ROM, an I/O interface, etc., and can execute various types of signal processing in accordance with a program stored in the ROM.

The vehicle 30 of FIG. 2 is a front and rear wheel drive (four-wheel drive) hybrid electromotive vehicle based on a front engine rear wheel (FR) drive system. The vehicle 30 includes an engine 32, a power transmission device 34 for hybrid electric vehicle (HEV) coupled to the engine 32, and a transfer 36 coupled to the power transmission device 34 for HEV. A front propeller shaft 38 and a rear propeller shaft 46 are connected to the transfer 36, with a driving force transmitted from the engine 32 and the power transmission device 34 for HEV to the transfer 36 being distributed via the transfer 36 to the front propeller shaft 38 and the rear propeller shaft 46. From the front propeller shaft 38, the driving force is transmitted via a front-wheel-side differential gear 40 and left and right front-wheel drive shafts 42 to left and right front wheels 44. From the rear propeller shaft 46, the driving force is transmitted via a rear-wheel-side differential gear 48 and left and right rear-wheel drive shafts 50 to left and right rear wheels 52. The rear wheels 52 are main driving wheels that act as driving wheels in both the cases of two-wheel drive (2WD) running and four-wheel drive (4WD) running, whereas the front wheels 44 are sub-driving wheels that act as driven wheels during 2WD running and that act as driving wheels during 4WD running. The engine 32 is an internal combustion engine such as a gasoline engine or a diesel engine and is used as a driving force source for running. In the engine 32, engine control equipment not shown having a throttle actuator, a fuel injector, an ignitor, etc. is controlled by the in-vehicle control device 130 so that an engine torque $T_e$ as an output torque of the engine 32 is controlled.

Figures 3, 4:
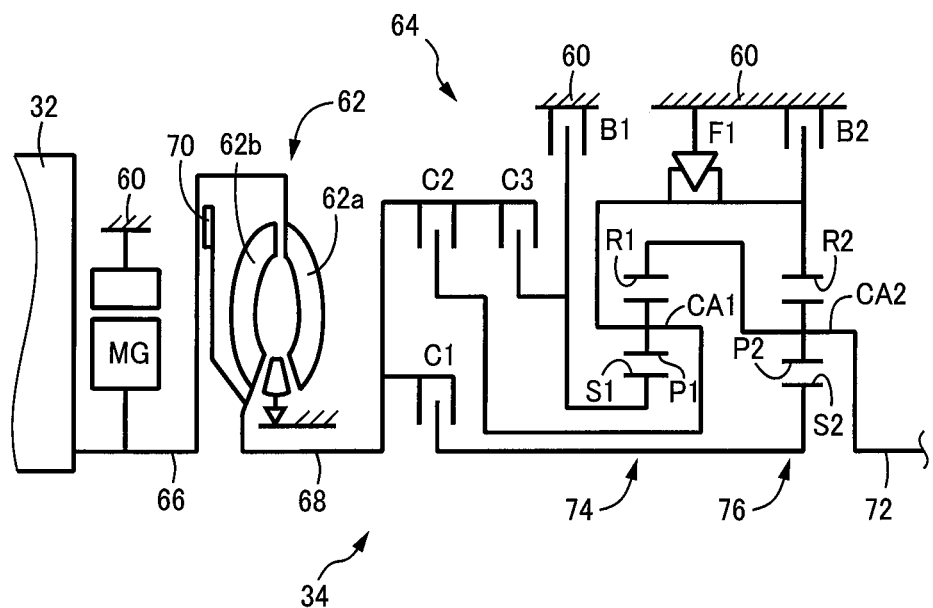
FIG. 3 is a skeleton diagram explaining a specific example of a power transmission device for the HEV (hybrid electrical vehicle) of FIG. 2.
FIG. 4 shows an engagement operation table representing relationships between a plurality of gear stages of a shift unit disposed in the power transmission device for the HEV of FIG. 3 and engaged/released states of engagement devices for establishing the plurality of gear stages.

FIG. 3 is a skeleton diagram explaining a specific example of the power transmission device 34 for HEV. In FIG. 3, the power transmission device 34 for HEV includes: a rotator MG arranged within a transmission case 60 (hereinafter, referred to as case 60) as a non-rotating member attached to a vehicle body; and a shift unit 64 coupled to the rotator MG and the engine 32 by way of a torque converter 62. These rotator MG, torque converter 62, and the shift unit 64 are each configured substantially symmetrically about a center line, but in the skeleton diagram of FIG. 3 the lower half with respect to the center line is omitted. The rotator MG is a motor generator, for example, a three-phase AC synchronous motor, having both an electric motor function to generate a mechanical power from an electric power and a generator function to generate an electric power from a mechanical power. In the rotator MG, an MG torque $T_{mg}$ i.e., the torque of the rotator MG and an MG rotation number $N_{mg}$ i.e., the rotation speed of the rotator MG are controlled by the in-vehicle control device 130. The rotator MG is used as a driving force source to generate a driving force for running in replacement of the engine 32 or in addition to the engine 32. The rotator MG is regenerative controlled to function as a generator when rotationally driven by a power of the engine 32 or driven force input from the wheels 44 and 52 side, to thereby perform power generation, and generates regenerative braking in the case of being coupled to the wheels 44 and 52. The rotator MG is coupled directly or via a damper not shown, etc. to a crankshaft of the engine 32. Between the rotator MG and the engine 32, there may be disposed an engine connection/disconnection clutch or the like for connecting/disconnecting power transmission.

The torque converter 62 includes a pump blade wheel 62a coupled via an MG coupling shaft 66 to the rotator MG, and a turbine blade wheel 62b coupled to an input shaft 68 of the shift unit 64. The torque converter 62 includes an LU (lockup) clutch 70 that couples the pump blade wheel 62a and the turbine blade wheel 62b together. In the LU clutch 70, an LU oil pressure $PR_{lu}$ is controlled by the in-vehicle control device 130 to allow an LU clutch torque $T_{lu}$, i.e., the torque capacity of the LU clutch 70 to change so that the working state i.e., the control state is switched. The working state of the LU clutch 70 includes a released state in which the LU clutch 70 is released, a slip state in which the LU clutch 70 is engaged with slippage, and a lockup state in which the LU clutch 70 is fully engaged. By disengaging the LU clutch 70, a torque converter state appears in which a torque amplification effect is obtained by the torque converter 62. By locking up the LU clutch 70, the torque converter 62 is directly coupled allowing the pump blade wheel 62a and the turbine blade wheel 62b to be integrally rotated.

The shift unit 64 stepwise changes an input rotation number $N_i$, i.e., the rotation speed of the input shaft 68 to transmit it to an output shaft 72. The shift unit 64 is a planetary gear type staged automatic transmission including a first planetary gear drive 74 and a second planetary gear drive 76 which are both of single pinion type. In the shift unit 64, a plurality of gear stages each having a different gear ratio $\gamma$ [=input rotation number $N_i$/rotation number of output shaft 72 (output rotation number) $N_o$] are mechanically established. The input rotation number $N_i$ is equal to a turbine rotation number $N_t$ that is the output rotation number of the torque converter 62, while the output rotation number $N_o$ corresponds to a vehicle velocity V. The first planetary gear drive 74 includes three rotating elements, i.e., a first sun gear S1, a first carrier CA1 carrying a first pinion gear P1 in a rotatable and revolvable manner, and a first ring gear R1 meshing via the first pinion gear P1 with the first sun gear S1. The second planetary gear drive 76 includes three rotating elements i.e., a second sun gear S2, a second carrier CA2 carrying a second pinion gear P2 in a rotatable and revolvable manner, and a second ring gear R2 meshing via the second pinion gear P2 with the second sun gear S2.

In the first planetary gear drive 74 and the second planetary gear drive 76, the first sun gear S1 is selectively coupled via a third clutch C3 to the input shaft 68 and is selectively coupled via a first brake B1 to the case 60. The first carrier CA1 is integrally coupled to the second ring gear R2. The first carrier CA1 and the second ring gear R2 are selectively coupled via a second clutch C2 to the input shaft 68 and are selectively coupled via a second brake B2 to the case 60. The first carrier CA1 and the second ring gear R2 are coupled via a one-way clutch F1 to the case 60 which is a non-rotating member so that rotation in the same direction as that of the engine 32 is permitted but so that rotation in the opposite direction is prohibited. The first ring gear R1 is integrally coupled to the second carrier CA2, with the first ring gear R1 and the second carrier CA2 being coupled to the output shaft 72. The second sun gear S2 is selectively coupled via a first clutch C1 to the input shaft 68. The first clutch C1, the second clutch C2, the third clutch C3, the first brake B1, and the second brake B2 (hereinafter, referred to as engagement device CB when no particular distinction is made) are hydraulic friction engagement devices engaged by a hydraulic actuator. By engaging each clutch C and brake B in accordance with an engagement operation table shown in FIG. 4, a plurality of gear stages $G_{sh}$ are established that include forward four speeds i.e., a first gear stage $1^{st}$ to a fourth gear stage $4^{th}$ and a reverse gear stage Rev. By releasing all of the engagement devices CB, the gear stage enters neutral N that cuts off power transmission. Parenthesized (o) in FIG. 4 means engagement when activating engine braking. That is, the shift unit 64 is a staged transmission in which the plurality of gear stages $G_{sh}$ are established depending on the engaged/released state of the plurality of engagement devices.

Referring back to FIG. 2, the transfer 36 includes for example: a sub-transmission that changes rotation transmitted from the output shaft 72 of the shift unit 64 in two stages, high (transfer Hi) and low (transfer Lo); a distribution mechanism that distributes a driving force output from the sub-transmission to the front propeller shaft 38 and the rear propeller shaft 46 with a given distribution ratio; a differential lock device that limits differential rotation between the front propeller shaft 38 and the rear propeller shaft 46; and a 2WD-4WD switching device that switches the driving mode between the two-wheel drive driving only the rear wheels 52 and the four-wheel drive driving the front and rear wheels 44 and 52. A high-low switching device of the sub-transmission, the differential lock device, and the 2WD-4WD switching device are electrically controlled by the in-vehicle control device 130. Another transfer 36 may be employed that can control the distribution ratio of the driving force to the front propeller shaft 38 and the rear propeller shaft 46.

The vehicle 30 includes the in-vehicle control device 130 as a control device that executes various controls. The in-vehicle control device 130 is configured to include, for example, a so-called microcomputer having a CPU, a RAM, a ROM, an I/O interface, etc., the CPU performing signal processing in accordance with a program previously stored in the ROM while utilizing a temporary storage function of the RAM, to thereby execute various controls for the vehicle 30. The in-vehicle control device 130 is configured including, if necessary, a plurality of electronic control devices for engine control, for MG control, for hydraulic control, etc.

The in-vehicle control device 130 receives various signals, etc. that are based on detection values of corresponding sensors, respectively, disposed in the vehicle 30. The various sensors include, for example, an engine rotation number sensor 90, a turbine rotation number sensor 92, an output rotation number sensor 94, an MG rotation number sensor 96, an accelerator opening sensor 98, a throttle valve opening sensor 100, a road surface gradient sensor 102, an acceleration sensor 104, a gear stage detector 106, an intervehicle distance sensor 108 such as a millimeter wave radar, an autocruise setting device 110, a platoon participation device 112, and a lever position sensor 120. The various signals include signals indicative of, for example, an engine rotation number $N_e$, i.e., the rotation speed of the engine 32, the turbine rotation number $N_t$ equal to the input rotation number $N_i$, the output rotation number $N_o$ corresponding to the vehicle velocity V, the MG rotation number $N_{mg}$, i.e., the rotation speed of the rotator MG, an accelerator opening $\theta_{acc}$ that is the amount of operation of an accelerator operating member such as an accelerator pedal and that indicates the amount of power demanded by the driver, a throttle valve opening $\theta_{th}$ that is the opening degree of an electronic throttle valve, a road surface gradient $\Phi$, a longitudinal acceleration $G_a$ and a lateral acceleration $G_b$ of the vehicle 30, the gear stage $G_{sh}$ of the shift unit 64, an intervehicle distance $D_{is}$ to a preceding vehicle, an autocruise setting information $A_{crui}$, platoon participation information $C_{ara}$, and an operation position $POS_{sh}$ of a shift lever 122. The gear stage detector 106 can detect the gear stages $G_{sh}$, e.g., from the working states of the engagement devices CB of the shift unit 64, but may identify the gear stages $G_{sh}$ by calculating the gear ratio γ from the input rotation number $N_i$ and the output rotation number $N_o$.

The shift lever 122 is a shift operation member that is arranged in the vicinity of a driver's seat to be operated by a driver to switch a shift range representing a power transmission state of the shift unit 64, the shift lever 122 having a plurality of operation positions $POS_{sh}$. For example, a plurality of positions P, R, N, and D are disposed as the operation positions $POS_{sh}$. The P position is an operation position allowing selection of a P (parking) range for parking that puts the shift unit 64 in a neutral state cutting off the power transmission and that mechanically prevents rotation of the output shaft 72. The neutral state is a state for example where all of the engagement devices CB of the shift unit 64 are released. The R position is an operation position allowing the selection of an R (reverse) range for reverse running that puts the shift unit 64 in a reverse stage "Rev". The N position is an operation position allowing the selection of an N (neutral) range that puts the shift unit 64 in the neutral state, similarly to the P position. The D position is an operation position allowing the selection of a D (drive) range for forward running that automatically switches a plurality of forward gear stages $1^{st}$ to $4^{th}$ of the shift unit 64 in accordance with previously defined shift conditions in which the variable is a running state such as, e.g., the vehicle velocity V or a demanded drive torque $Tr_{dem}$. The shift lever 122 may have an operation position $POS_{sh}$ for switching the power transmission state of the transfer 36.

The autocruise setting device 110 is a device for selecting autocruise running in which constant-velocity running and follow-up running are implemented with automatic driving that automatically controls the engine 32 and the rotator MG as the driving force sources so as to allow running in a predefined target running state without needing the driver's acceleration/deceleration operation. That is, the vehicle 30 of the embodiment enables the autocruise running in which the engine 32 and the rotator MG are automatically controlled in accordance with the target vehicle velocity $V_t$, etc., as well as manual driving in which the engine 32 and the rotator MG are controlled in accordance with the driver's acceleration/deceleration operations using the accelerator pedal or the like. The autocruise setting device 110 is a device not only for selecting the autocruise running but also for, e.g., setting the target vehicle velocity $V_t$, increase/decrease of the target vehicle velocity $V_t$, a target intervehicle distance $D_t$ during follow-up running that runs following a preceding vehicle. The autocruise setting device 110 is disposed, e.g., on a steering wheel, to receive the target vehicle velocity $V_t$, the target intervehicle distance $D_t$, etc. that are entered as autocruise setting information $A_{crui}$ by the driver.

The platoon participation device 112 is a device operated when joining a platoon and running as the leading vehicle 12le or the following vehicle 12fo, the platoon participation device 112 receiving, e.g., whether to join as the leading vehicle 12le, whether to join as the following vehicle 12fo, and the order of running in the case of joining as the following vehicle 12fo, that are entered as the platoon participation information $C_{ara}$ by the driver. The driver may enter, as the platoon participation information $C_{ara}$, transmission information containing, e.g., identification numbers by which the vehicles 30 can be individually identified and the number of the gear stages of the shift unit 64 mounted. However, the entry is unnecessary in the case where those pieces of platoon participation information are registered in advance in the in-vehicle control device 130 by initial setting or the like. In the embodiment, another vehicle mounted with a continuously variable transmission or a manual transmission, different from the vehicle 30, can also join a platoon as the platoon participating vehicle 12, with transmission information on the continuously variable transmission or the manual transmission also being set as the platoon participation information $C_{ara}$ in an in-vehicle control device of the vehicle linked with the server 20. The platoon participation device 112 is configured using, for example, a touch panel capable of touch input, but input may be made by using a terminal such as a smartphone owned by the driver. Platoon implementation information may be previously determined and set in the server 20 by a platoon manager, etc. so that the platoon implementation information is conveyed from the server 20 to target platoon participating vehicles 12 or their drivers, etc. The platoon implementation information includes date and time for platooning, a plurality of platoon participating vehicles 12 that join a platoon, whether to be the leading vehicle 12le or the following vehicle 12fo, and the order of running of the following vehicles 12fo.

The in-vehicle control device 130 issues various command signals for controlling the devices disposed in the vehicle 30 (e.g., the engine 32, the rotator MG, the LU clutch 70, the shift unit 64, and the transfer 36). The various command signals include, for example, an engine control command signal $S_e$ for controlling the engine 32, an MG control command signal $S_{mg}$ for controlling the rotator MG, an LU control command signal $S_{lu}$ for controlling the LU clutch 70, a shift control command signal $S_{sh}$ for switching the gear stages $G_{sh}$ of the shift unit 64, and a transfer control command signal $S_{tran}$ for switching the power transmission state of the transfer 36.

The vehicle 30 includes an automatic braking system 80 in relation to the autocruise running. The automatic braking system 80 electrically controls braking forces, i.e., brake oil pressures of wheel brakes 82fl, 82fr, 82rl, 82rr (hereinafter, referred to as wheel brake 82 when not particularly distinguished) disposed on the front wheels 44 and the rear wheels 52, in accordance with automatic brake control command signal $S_{br}$ fed from the in-vehicle control device 130. By stepping on a brake pedal not shown, a brake oil pressure is supplied via a brake master cylinder to the wheel brake 82, thereby mechanically generating a braking force corresponding to the brake oil pressure, i.e., a brake operating force.

To achieve various controls in the vehicle 30, the in-vehicle control device 130 functionally includes a hybrid control unit 132, a shift control unit 134, an LU clutch control unit 136, an autocruise control unit 138, and a platoon joining control unit 140.

The hybrid control unit 132 cooperatively controls working of the engine 32 and the rotator MG. The hybrid control unit 132 applies an accelerator opening $\theta_{acc}$ and a vehicle velocity V to, e.g., a driving demand amount map to thereby calculate a driver's driving demand amount for the vehicle 30. The driving demand amount is, for example, a demanded driving force $F_{rdem}$ or a demanded driving torque $T_{rdem}$ in the front and rear wheels 44 and 52. Considering a transmission loss, an accessory load, a gear ratio γ of the shift unit 64, a torque ratio of the torque converter 62, etc., the hybrid control unit 132 finds, e.g., a demanded TC input torque $T_{ecdem}$ that is an input torque of the torque converter 62 required for achieving the demanded driving torque $T_{rdem}$, and outputs an engine control command signal $S_e$ controlling the engine 32 and an MG control command signal $S_{mq}$ controlling the rotator MG so as to be able to obtain the demanded TC input torque $T_{ecdem}$.

In the case where the demanded TC input torque $T_{tcdem}$ can be covered by only the output of the rotator MG, the hybrid control unit 132 provides a battery electric vehicle (BEV) running mode that is a motor running mode running by driving the rotator MG. In the BEV running mode, BEV running is performed where the vehicle 30 runs using only the rotator MG as the driving force source with the engine 32 stopped. In the case where an engine connection/disconnection device is disposed between the rotator MG and the engine 32, it is desirable to release the engine connection/disconnection device to disconnect the engine 32 from a driveline to thereby prevent the engine 32 from spinning. In this BEV running mode, the MG torque $T_{mg}$ is controlled so as to achieve the demanded TC input torque $T_{tcdem}$. On the other hand, in the case where the demanded TC input torque $T_{tcdem}$ cannot be covered if not using at least the output of the engine 32, the hybrid control unit 132 provides a hybrid electric vehicle (HEV) running mode that is an engine running mode. In the HEV running mode, engine running, i.e., HEV running is performed where the vehicle 30 runs using at least the engine 32 as the driving force source. In this HEV running mode, the engine torque $T_e$ is controlled to achieve all or part of the demanded TC input torque $T_{tcdem}$, while the MG torque $T_{mq}$ is controlled to compensate for the torque insufficient for the demanded TC input torque $T_{tcdem}$, i.e., an amount of difference between the demanded TC input torque $T_{tcdem}$ and the engine torque $T_e$. On the other hand, for example, when the engine 32, etc. are required to warm up, even if the demanded TC input torque $T_{tcdem}$ can be covered by only the output of the rotator MG, the hybrid control unit 132 allows establishment of the HEV running mode. In this manner, based on the demanded TC input torque $T_{tcdem}$, etc., the hybrid control unit 132 switches the running mode between the BEV running mode and the HEV running mode, by, for example: automatically stopping the engine 32 during the HEV running; restarting the engine 32 after the stop of the engine; starting the engine 32 during the BEV running; or automatically stopping the engine 32 or starting the engine 32 during stoppage.

Figure 5:
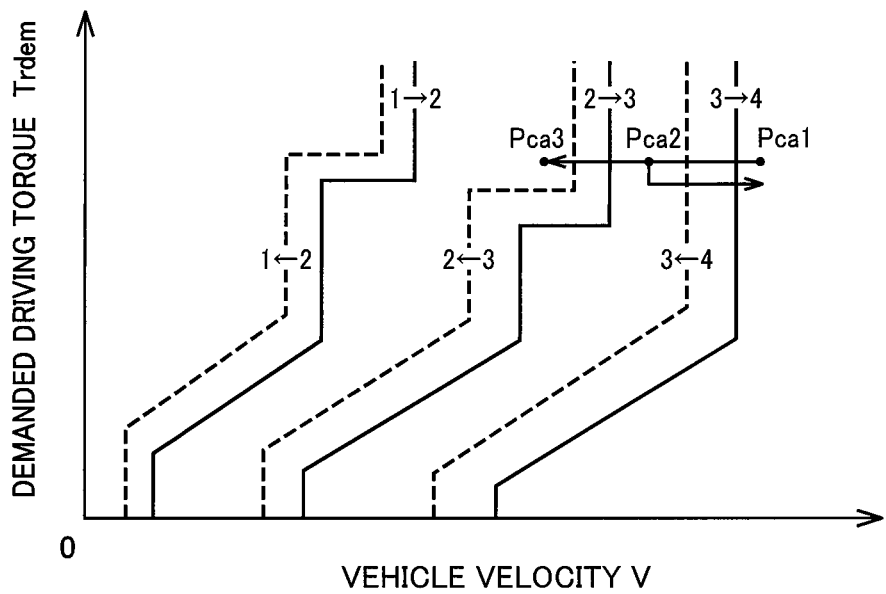
FIG. 5 is a diagram explaining an example of a shift map that a shift control unit functionally included in an in-vehicle control device of the vehicle of FIG. 2 uses in shift control over a shift unit of FIG. 3.

When a D range is selected, the shift control unit 134 executes automatic shift control in which shift determination of the shift unit 64 is made in accordance with shift conditions such as a shift map previously defined with variables in the form of running states such as, e.g., the vehicle velocity V, the demanded driving torque $T_{rdem}$, etc., to issue a shift control command signal $S_{sh}$ for automatically switching the plurality of forward gear stages $G_{sh}$ of the shift unit 64 as needed. FIG. 5 shows an example of the shift map in the case of including a four-stage transmission of FIG. 3 as the shift unit 64, the shift map being defined with the demanded driving torque $T_{rdem}$ and the vehicle velocity V as variables, where solid lines are upshift lines for making upshift determination, with broken lines being downshift lines for making downshift determination. This shift map is defined such that the driving force sources (the engine 32 and the rotator MG) can work in a proper working range, e.g., torque range or rotation number range, depending on the demanded driving torque $T_{rdem}$ and the vehicle velocity V. Specifically, the shift map is defined such that the higher the vehicle velocity V is or the lower the demanded driving torque $T_{rdcm}$ is, the gear shifts to a gear stage $G_{sh}$ on a high velocity side where the gear ratio γ becomes smaller, whereas the lower the vehicle velocity V is or the higher the demanded driving torque $T_{rdcm}$ is, the gear shifts to a gear stage $G_{sh}$ on the low velocity side where the gear ratio γ becomes greater. Numerals 1 to 4 of FIG. 5 mean a first gear stage $1^{st}$ to a fourth gear stage $4^{th}$. The demanded driving torque $T_{rdem}$ is equivalent to the driving demand amount and may be replaced with, e.g., the demanded driving force $F_{rdem}$ or the accelerator opening $\theta_{acc}$. The vehicle velocity V may be substituted with, e.g., the output rotation number $N_o$. Although in the embodiment the vehicle velocity V is calculated based on the output rotation number $N_o$, the vehicle velocity V may be found, e.g., by detecting wheel velocities of the front and rear wheels 44 and 52 or by detecting rotation numbers of the propeller shafts 38 and 46.

The shift control unit 134 executes manual shift control that allows the driver to operate the shift lever 122 or a manual shift operation member disposed in the vicinity of the driver's seat and that, when fed with a shift command signal, switches the forward gear stages $G_{sh}$ of the shift unit 64 in accordance with the shift command.

Figure 6:
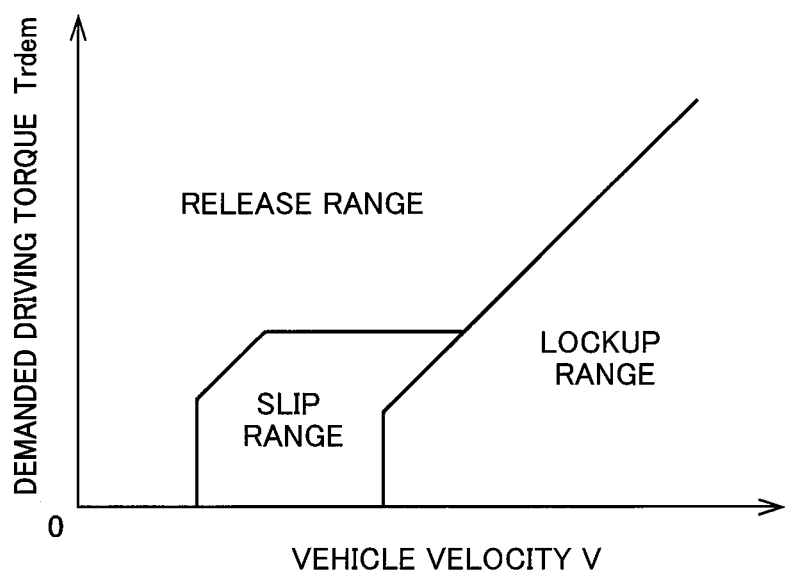
FIG. 6 is a diagram explaining an example of an LU clutch switching map used in lockup control by an LU clutch control unit functionally included in the in-vehicle control device of the vehicle of FIG. 2.

The LU clutch control unit 136 acts to switchingly control the working state of the LU clutch 70, that is, executes the lockup control to control the LU oil pressure $PR_{lu}$ equivalent to a lockup differential pressure of the LU clutch 70. The LU clutch control unit 136 switches the working state of the LU clutch 70 among the released state, the slip state, and the lockup state, in accordance with lockup clutch switching conditions previously defined with variables in the form of the running states such as, e.g., the vehicle velocity V, the demanded driving torque $T_{rdem}$, etc. FIG. 6 shows an example of an LU clutch switching map that represents the lockup clutch switching conditions, where with the vehicle velocity V and the demanded driving torque $T_{rdem}$ as the variables, there are defined three ranges, i.e., a release range for putting the LU clutch 70 into the released state, a slip range for putting it into a predetermined slip state, and a lockup range for putting it into the engaged state. The lockup range is set on the high vehicle velocity and low demanded driving torque side, the release range is set on the low vehicle velocity and high demanded driving torque side, and the slip range is set on a range between the lockup range and the release range, whose demanded driving torque $T_{rdem}$ is small. Then, based on the actual vehicle velocity V and demanded driving torque $T_{rdem}$, the LU clutch control unit 136 determines which range it is among the release range, the slip range, and the lockup range, and issues an LU control command signal $S_{lu}$ so that the LU clutch 70 has a working state corresponding to the range determined. The LU control command signal $S_{lu}$ is a signal for controlling the LU oil pressure $PR_{lu}$, i.e., the LU clutch torque $T_{lu}$ so that the working state of the LU clutch 70 is controlled based on the LU clutch torque $T_{lu}$. Similar to the shift map of FIG. 5, the LU clutch switching map of FIG. 6 can also have hysteresis at the boundaries between the ranges. In the LU clutch switching map of FIG. 6, a boundary line entering the release range from the lockup range or the slip range is equivalent to lockup clutch release conditions for switching the LU clutch 70 to the released state. The demanded driving torque $T_{rdem}$ is equivalent to the driving demand amount and may be replaced with, e.g., the demanded driving force $F_{rdem}$ or the accelerator opening $\theta_{acc}$. The vehicle velocity V may be substituted with, e.g., the output rotation number $N_o$.

The autocruise control unit 138 executes the autocruise running as the automatic driving. The autocruise running allows autonomous running without needing the driver's acceleration/deceleration operation. The autocruise control unit 138 executes constant-velocity running control allowing constant-velocity running at the target vehicle velocity $V_t$ set by the autocruise setting device 110 and follow-up running control allowing follow-up running while keeping the target intervehicle distance $D_t$ set by the autocruise setting device 110. In the constant-velocity running control, the autocruise control unit 138 calculates a demanded driving torque $T_{rdem}$ necessary for running at the target vehicle velocity $V_t$, and, considering the transmission loss, the accessory load, the gear ratio γ of the shift unit 64, the torque ratio of the torque converter 62, etc., finds a demanded TC input torque $T_{tcdem}$ necessary for achieving the demanded driving torque $T_{rdem}$. The autocruise control unit 138 then outputs an engine control command signal $S_e$ controlling the engine 32 and an MG control command signal $S_{mg}$ controlling the rotator MG so as to be able to obtain the demanded TC input torque $T_{tcdem}$. In this case, the demanded driving torque $T_{rdem}$ is found by feedback control, feedforward control, or the like based on, e.g., a difference between the target vehicle velocity $V_t$ and the actual vehicle velocity V. On the other hand, in the follow-up running control allowing follow-up running while keeping the target intervehicle distance $D_t$ with respect to the preceding vehicle, the autocruise control unit 138 figures out a demanded driving torque $T_{rdem}$ necessary for follow-up running with the intervehicle distance $D_{is}$ being equal to the target intervehicle distance $D_t$ and controls the engine torque $T_e$ and the MG torque so as to be able to obtain the demanded driving torque $T_{rdem}$. The target intervehicle distance $D_t$ is variably set depending on, e.g., the vehicle velocity V. In the case where the demanded driving torque $T_{rdem}$ is negative (minus) such as when the preceding vehicle decelerates, engine braking is activated or regenerative braking is generated by the rotator MG, or if necessary, the braking is combined with a braking force of the wheel brake 82 controlled by the automatic braking system, so that a negative demanded driving torque $T_{rdem}$ can be obtained. Also during this autocruise running, the shift control unit 134 executes shift control for switching the gear stages $G_{sh}$ of the shift unit 64 in accordance with the shift conditions of, e.g., the shift map of FIG. 5, while the LU clutch control unit 136 executes the lockup control for switching the working state of the LU clutch 70 in accordance with the lockup clutch switching conditions of, e.g., the LU clutch switching map of FIG. 6.

The platoon joining control unit 140 is involved in control when the vehicle 30 joins a platoon as the platoon participating vehicle 12. For example, the platoon joining control unit 140 sends, e.g., the platoon participation information $C_{ara}$ to the server 20 to join the platoon and perform autocruise running controlled by the autocruise control unit 138. In the case of joining as the following vehicle 12fo, the follow-up running is performed while keeping a predetermined intervehicle distance $D_{is}$ (=target intervehicle distance $D_t$) from the preceding vehicle under the follow-up running control. During participating in the platoon, the platoon joining control unit 140 executes platoon joining control shown at step SV3 of a flowchart of FIG. 10. Specifically, the platoon joining control unit 140 executes controls (i) to (iii) which follow.

(i) Prohibit the automatic shift control for automatically switching the gear stages $G_{sh}$ of the shift unit 64 by the shift control unit 134, to perform shift control of the shift unit 64 in accordance with a shift command from the server 20.

(ii) Prohibit the manual shift control effected by the shift control unit 134, that is, prohibit shift control of the shift unit 64 based on a driver's shift command.

(iii) Prohibit the lockup control for switching the working state of the LU clutch 70 by the LU clutch control unit 136, to switch the working state of the LU clutch 70 in accordance with a switching command sent from the server 20.

The server 20 of the platoon management center functionally includes a platoon shift control unit 22 and a platoon lockup control unit 24. The platoon shift control unit 22 prohibits shift control effected by the shift control unit 134 disposed in each platoon participating vehicle 12, to execute platoon shift control in accordance with steps S1 to S7 (hereinafter, referred to simply as S1 to S7 with "steps" omitted; the same applies to other flowcharts) of a flowchart of FIG. 7. This flowchart is repeatedly executed at a predetermined control cycle time. In diamond-shaped determination steps, YES and NO mean affirmative and negative, respectively.

Figure 7:
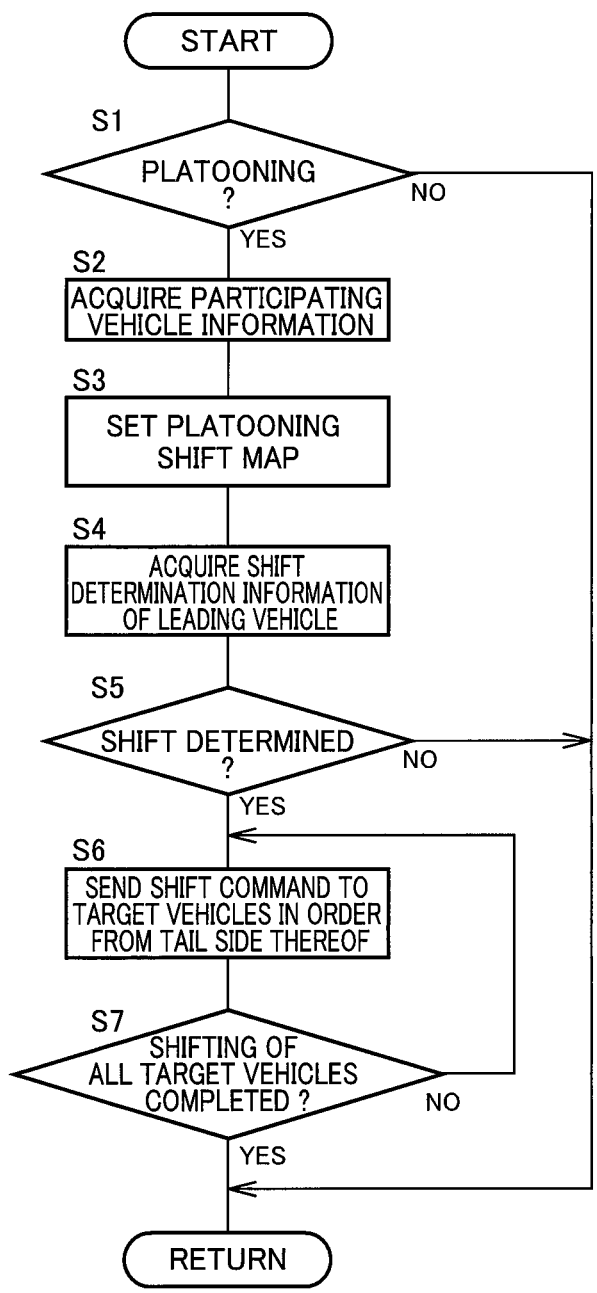
FIG. 7 is a flowchart specifically explaining platoon shift control executed by a platoon shift control unit that a server of FIG. 1 functionally includes.

At S1 of FIG. 7, it is determined whether vehicles are platooning, and if affirmative, S2 and subsequent steps are executed, whereas if negative, control comes to an end directly. Whether vehicles are platooning can be determined from, e.g., sending/reception of information to/from platoon participating vehicles 12, but may be determined by flags or the like. At S2, participating vehicle information is acquired from all of the platoon participating vehicles 12.

The participating vehicle information is information required for platooning management and shift control, and specifically, includes vehicle identification information identifying individual platoon participating vehicles 12, information on the running order containing a leading vehicle 12le, and transmission information on the type of the shift unit 64 mounted, the number of gear stages thereof, the shift progress status thereof, etc. In the embodiment, vehicles each mounted with a manual transmission or a continuously variable transmission can also join a platoon, so that information on the manual transmission and the continuously variable transmission is also acquired as transmission information from those vehicles. For the manual transmission, manual transmission information is also acquired that enables determination on whether it is shifting.

At S3, a platooning shift map is set as shift conditions for platooning shift control, with the variables that are the demanded driving torque $T_{rdem}$ and vehicle velocity V representing a running state, similar to the shift map shown in FIG. 5 for example. The platooning shift map is also defined so that the driving force sources (engine 32 and the rotator MG) work in a proper working range, e.g., torque range or rotation number range depending on the demanded driving torque $T_{rdem}$ and the vehicle velocity V. Although the shift map of FIG. 5 used in solo running may be utilized intactly as the platooning shift map, in the embodiment, a new shift map is generated that has shift lines (upshift line and downshift line) deviated to the high vehicle velocity side wholly than those of FIG. 5 in order to facilitate follow-up running with the target intervehicle distance $D_t$ kept. That is, frequent use is made of low-speed gear stages with excellent driving force responsiveness.

Figures 11, 12:
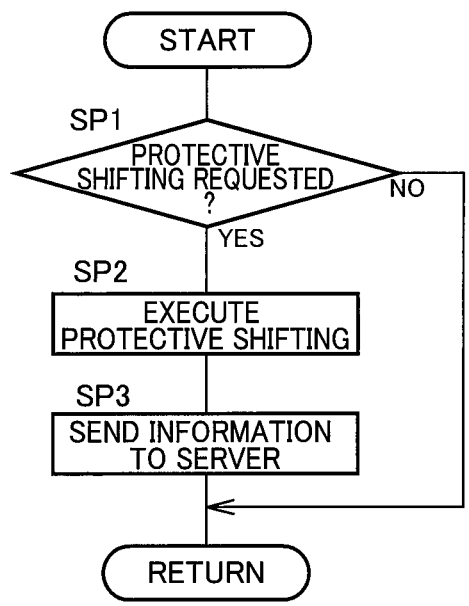
FIG. 11 is a flowchart explaining protective shifting executed with the platoon joining control limited.
FIG. 12 is a diagram showing an example of a gear stage allocation table that is referred to when setting a platooning shift map at step S3 of FIG. 7.

At S3, in the case of including plural types of shift units 64 each having a different number of gear stages, the shift timing of each of the shift units 64 is set using a gear stage allocation table as shown in FIG. 12 so that based on a platooning shift map of the shift unit 64 with a largest number of gear stages for example, shifting of the other shift units 64 is performed at the same timing. FIG. 12 shows an example of the gear stage allocation table in the case of including a 4-speed transmission to a 6-speed transmission as the shift unit 64, 1 to 6 in a gear stage column meaning a first gear stage to a sixth gear stage, respectively. Shift between the first gear stage and the second gear stage is performed at the same timing in all the transmissions. Shift between the second gear stage and the third gear stage is performed at the same timing in a 4-speed transmission and a 5-speed transmission, whose shift timing is the same as that between the third gear stage and the fourth gear stage of a 6-speed transmission. Shifts are defined therein to be performed at the same timing: between the third gear stage and the fourth gear stage of the 4-speed transmission; between the fourth gear stage and the fifth gear stage of the 5-speed transmission; and between the fifth gear stage and the sixth gear stage of the 6-speed transmission. Such a gear stage allocation table is prepared in advance depending on the type and the number of gear stages of the shift unit 64 of the platoon participating vehicle 12.

At S4 of FIG. 7, shift determination information of the leading vehicle 12le is acquired. The shift determination information is information needed for making shift determination based on the platooning shift map set at S3, and specifically is the demanded driving torque $T_{rdem}$ and the vehicle velocity V that are variables of the platooning shift map. At S5, it is determined whether the demanded driving torque $T_{rdem}$ and the vehicle velocity V acquired from the leading vehicle 12le have changed across shift lines of the platooning shift map set at S3, and if affirmative, shift determination to shift is made to execute S6, whereas if negative, control comes to an end directly.

At S6, a shift command is sent to target vehicles to be shifted as a result of this shift determination, in order from the tail side of the target vehicles. For example, in the case where for example, shift determination of the 6-speed transmission upshifting from the third gear stage to the fourth gear stage has been made, the 4-speed transmission and the 5-speed transmission also need to be upshifted from the second gear stage to the third gear stage, and hence the platoon participating vehicles 12 having one of the 4-speed transmission to the 6-speed transmission are target vehicles to be shifted. In the case where for example, shift determination of the 6-speed transmission downshifting from the fifth gear stage to the fourth gear stage has been made, the 5-speed transmission also needs to be downshifted from the fourth gear stage to the third gear stage, but the 4-speed transmission need not be shifted, and therefore the platoon participating vehicles 12 having the 5-speed transmission or the 6-speed transmission are target vehicles to be shifted. Shift commands are then issued so that shifting is performed in order from the tail side of the target vehicle. The platoon participating vehicles 12 commanded to shift execute shifting of the shift unit 64 via the platoon joining control unit 140. The platoon joining control unit 140 causes, e.g., the shift control unit 134 to execute the shifting in accordance with the shift command sent from the server 20. When acquiring shift completion information from the platoon participating vehicles 12 each receiving a shift command, the platoon shift control unit 22 determines at S7 whether shifting of all the target vehicles has been completed, and repeatedly executes S6 and S7 until the completion of shifting of all the target vehicles. This allows shifting to be executed for each of platoon participating vehicles 12 in order from the tail side of the target vehicles, and, when shifting of all the target vehicles is completed, determination at S7 goes to YES, bringing a series of platoon shift controls to an end. Instead of acquiring the shift completion information, in the case of satisfying previously defined shift completion determination conditions such as the case where a certain time has elapsed from the start of shift control, shift completion determination may be made to output a shift command to a next target vehicle. Due to no need to wait until the completion of shift control, the shift command may be sent to the next target vehicle in the middle of shift control.

Figure 13:
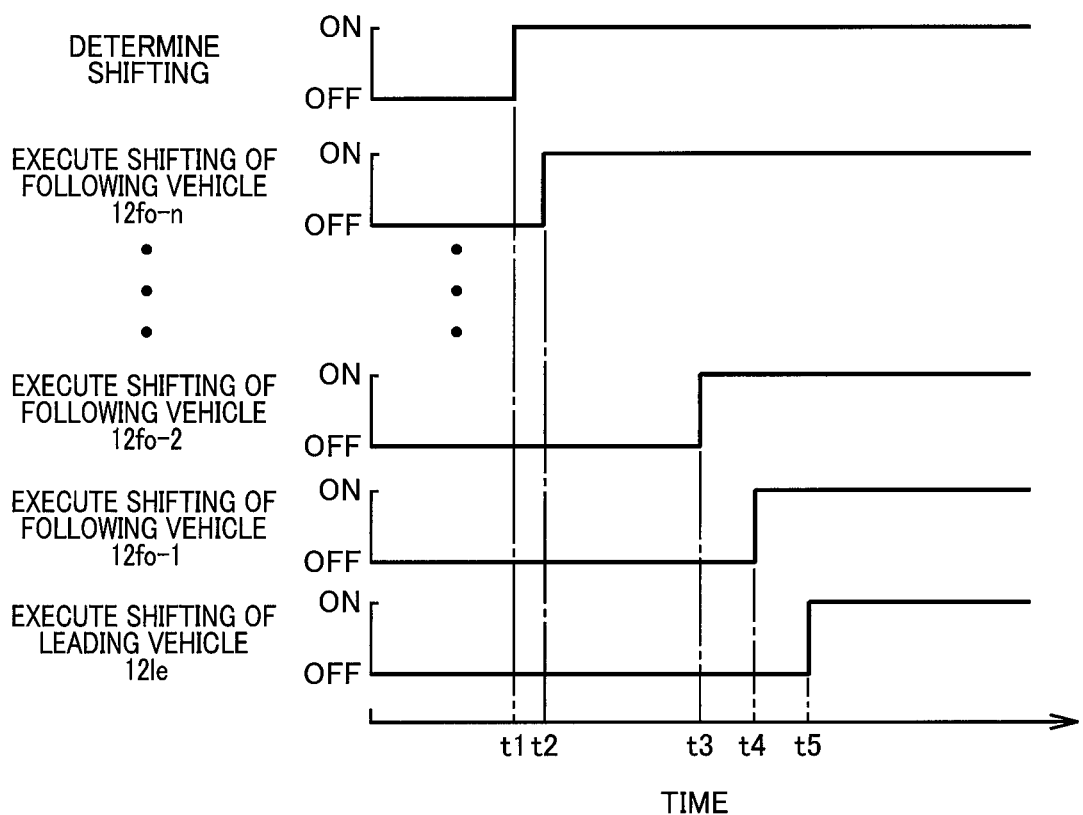
FIG. 13 shows an example of a time chart indicating deviations in shift timing in the case where shifting of the platoon participating vehicles has been carried out in accordance with the flowchart of FIG. 7.

FIG. 13 shows an example of a time chart indicating deviations in shift execution timing of the platoon participating vehicles 12 in the case where shifting has been executed for all the platoon participating vehicles 12 in accordance with the flowchart of FIG. 7. In FIG. 13, time t1 is a time at which the shift determination is made based on information (demanded driving torque $T_{rdem}$ and the vehicle velocity V) of the leading vehicle 12le, resulting in YES determination at S5, and time t2 is a time at which a shift command is issued to the last following vehicle 12fo-n of the platoon to start shifting of the following vehicle 12fo-n. Subsequently, shifting is executed in order from the tail side. Time t3 is a time at which shifting of the following vehicle 12fo-2 lying at the third from the top starts, time t4 is a time at which shifting of the following vehicle 12fo-1 lying at the second from the top starts, and time t5 is a time at which shifting of the leading vehicle 12le starts.

Figure 8:
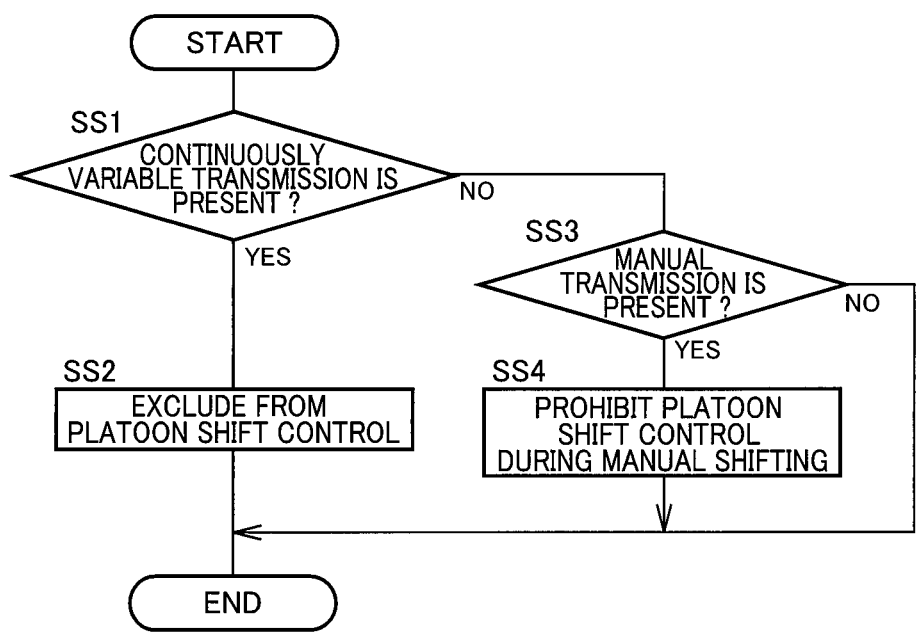
FIG. 8 is a flowchart explaining limitation control for limiting the platoon shift control of FIG. 7.

The platoon shift control unit 22 executes a flowchart of FIG. 8 in parallelism with the platoon shift control based on the flowchart of FIG. 7, with execution of the flowchart of FIG. 7 being limited under certain conditions. At SS1 of FIG. 8, it is determined whether a continuously variable transmission is contained in the participating vehicle information acquired at S2 of FIG. 7, and if affirmative, a platoon participating vehicle 12 having the continuously variable transmission is excluded from the target of platoon shift control at SS2 so that the platoon shift control is executed with the platoon participating vehicle 12 excluded. If the continuously variable transmission is not contained therein, that is, if determination at SS1 is negative, it is determined whether a manual transmission is contained at SS3, and if affirmative, shifting by the platoon shift control (S6 of FIG. 7) is prohibited while the manual transmission is shifting at SS4. Whether the manual transmission is shifting can be determined based on manual transmission information supplied from the platoon participating vehicle 12 having the manual transmission. The manual transmission information is, e.g., information on the working state of the clutch cutting off power transmission during the manual shifting, by which it can be determined based on the clutch working state whether the manual transmission is shifting, allowing determination that it is shifting if the clutch is disengaged.

Figure 9:
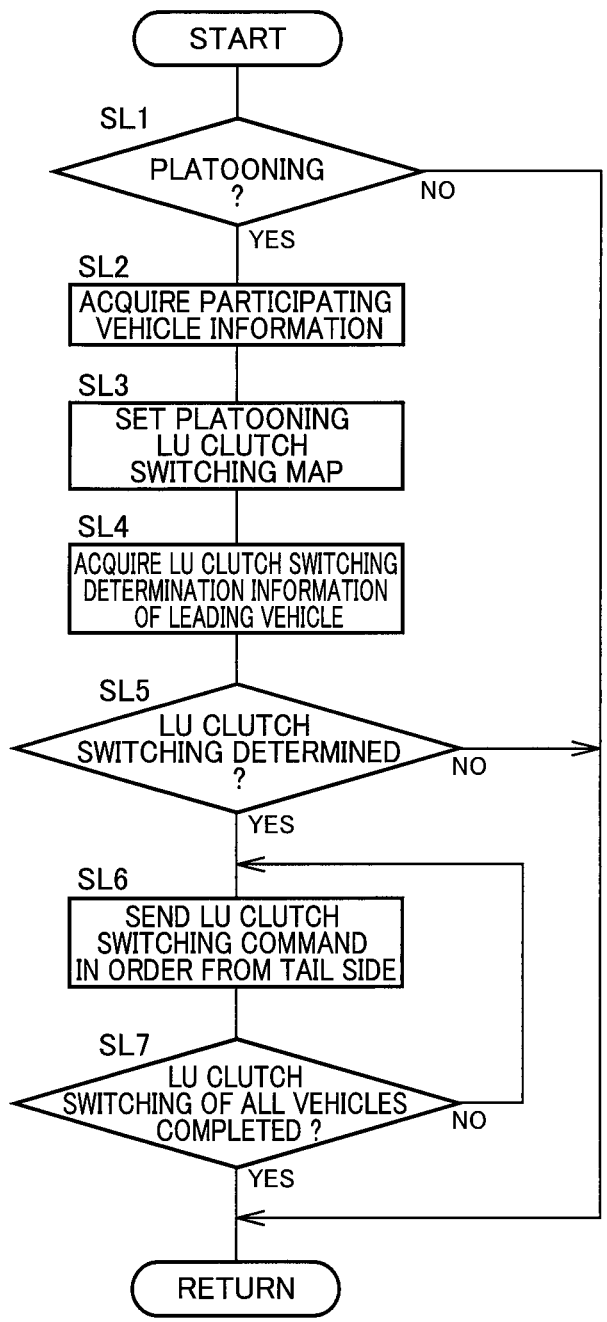
FIG. 9 is a flowchart specifically explaining platoon lockup control executed by a platoon lockup control unit that the server of FIG. 1 functionally includes.

Referring back to FIG. 1, the platoon lockup control unit 24 prohibits lockup control effected by the LU clutch control unit 136 included in each of the platoon participating vehicles 12, to execute platoon lockup control in accordance with SL1 to SL7 of a flowchart of FIG. 9. This flowchart is basically the same as the flowchart of FIG. 7 executing the platoon shift control, and therefore only differences will be described. Although a vehicle not having the LU clutch 70 can also join a platoon as a platoon participating vehicle 12, the platoon participating vehicle 12 without the LU clutch 70 is excluded from the target of the platoon lockup control according to the flowchart of FIG. 9 so that the platoon lockup control is executed with the platoon participating vehicle 12 excluded.

At SL2 of FIG. 9, the participating vehicle information contains LU clutch information on the type, the presence/absence, the working state switching progress status, etc. of the LU clutch 70, and at SL3, based on the LU clutch information, a platooning LU clutch switching map is set as lockup clutch switching conditions for platoon lockup control. Similar to the LU clutch switching map shown in FIG. 6, the platooning LU clutch switching map has a release range set on the low vehicle velocity and high demanded driving torque side with variables in the form of the demanded driving torque $T_{rdem}$ and the vehicle velocity V that represent the running state. Although the LU clutch switching map of FIG. 6 used in solo running may be utilized intactly as the platooning LU clutch switching map, in the embodiment, a new switching map is generated that has switching lines (boundary lines between the control ranges) deviated to the high vehicle velocity side wholly than those of FIG. 6 in order to facilitate follow-up running with the target intervehicle distance $D_t$ kept. That is, frequent use is made of a release range with excellent driving force responsiveness ensuring the torque amplification effect by the torque converter 62.

At SL4, LU clutch switching determination information of the leading vehicle 12le is acquired. The LU clutch switching determination information is information required for switching determination based on the platooning LU clutch switching map set at SL3, and is specifically the demanded driving torque $T_{rdem}$ and the vehicle velocity V that are variables of the platooning LU clutch switching map. The shift determination information acquired at S4 of FIG. 7 may be used as it is. At SL5, it is determined whether the demanded driving torque $T_{rdem}$ and the vehicle velocity V acquired from the leading vehicle 12le have changed across switching lines of the platooning LU clutch switching map set at SL3, and if affirmative, LU clutch switching determination is made to execute SL6, whereas if the LU clutch switching determination is negative, control comes to an end directly.

At SL6, a command to switch the working state of the LU clutch 70 is sent to the platoon participating vehicles 12 in order from the tail side thereof. The platoon participating vehicle 12 commended to switch executes switching of the working state of the LU clutch 70 via the platoon joining control unit 140. The platoon joining control unit 140 causes, e.g., the LU clutch control unit 136 to execute control to switch the working state in accordance with the switching command sent from the server 20. When acquiring switching completion information from the platoon participating vehicle 12 commanded to switch, the platoon lockup control unit 24 determines at SL7 whether switching of all of the platoon participating vehicles 12 has been completed, and repeatedly executes SL6 and SL7 until the completion of switching of all the vehicles. This allows the working state of the LU clutch 70 to be switched for each of the platoon participating vehicles 12 in order from the tail side of the platoon participating vehicles 12, and, when switching of all the target vehicles is completed, determination at SL7 goes to YES, bringing a series of platoon lockup controls to an end. Instead of acquiring the switching completion information, in the case of satisfying previously defined switching completion determination conditions such as the case where a certain time has elapsed from the start of switching control, switching completion determination may be made to output a switching command to a next platoon participating vehicle 12. Since the platoon lockup control unit 24 need not necessarily wait until the completion of switching control, it may send the switching command to the next platoon participating vehicle 12 in the middle of switching control.

Figure 10:
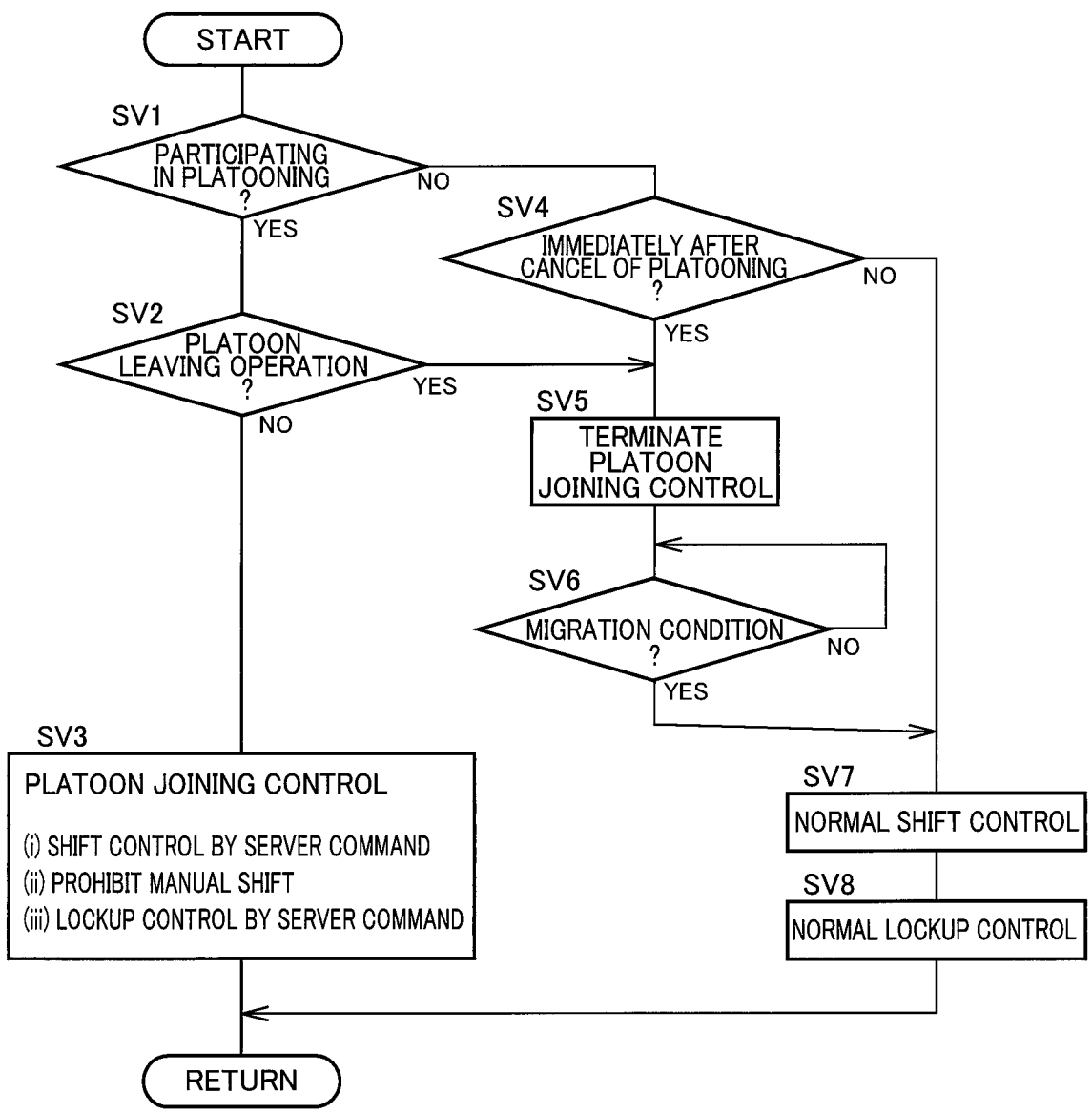
FIG. 10 is a flowchart specifically explaining platoon joining control executed by a platoon joining control unit that the in-vehicle control device of a vehicle of FIG. 2 functionally includes.

On the other hand, the platoon joining control unit 140 functionally included in the in-vehicle control device 130 of each of the platoon participating vehicles 12 executes platoon joining control in accordance with the flowchart of FIG. 10. At SV1 of FIG. 10, the platoon joining control unit 140 determines whether the vehicle is joining platooning, and if affirmative, determines at SV2 whether a platoon leaving operation has been performed. The leaving operation is an operation for the platoon participating vehicle 12 to individually leave the platoon. For example, it is a direction indicator operation to change course in a direction different from that of the preceding vehicle, whereby information of leaving the platoon is sent to the server 20. Leaving the platoon can be achieved by operating, e.g., the platoon participation device 112. Unless the leaving operation is performed, the platoon joining control unit 140 executes platoon joining control at SV3, allowing execution of shift control of the shift unit 64 in accordance with a shift command from the server 20 and execution of control to switch the working state of the LU clutch 70 in accordance with a switching command from the server 20. The shift control is executed via the shift control unit 134, while the control to switch the working state is executed via the LU clutch control unit 136.

If determination at SV1 is negative, that is, if the vehicle is not joining the platooning, the platoon joining control unit 140 executes SV4. At SV4, the platoon joining control unit 140 determines whether it is immediately after platooning is cancelled by the server 20 due to, e.g., the termination of platooning. If it is not immediately after the cancellation, that is, if the vehicle continues solo running, the platoon joining control unit 140 executes, at SV7 and SV8, normal shift control and lockup control at the time of solo running. Specifically, shift control is performed by the shift control unit 134 in accordance with the shift map shown in FIG. 5, while lockup control is performed by the LU clutch control unit 136 in accordance with the LU clutch switching map shown in FIG. 6.

If determination at SV4 is affirmative, that is, if for example, the vehicle is joining the platooning in the most-recent control cycle because it is immediately after the cancellation of platooning, then the platoon joining control unit 140 executes SV5. SV5 is executed also when affirmative determination is made at SV2, that is, also when the operation to leave the platooning is performed, bringing the platoon joining control at SV3 to an end. Subsequently, the platoon joining control unit 140 determines whether migration conditions previously defined at SV6 are satisfied, and if affirmative, the platoon joining control unit 140 returns to normal controls at SV7 and SV8. That is, due to the difference between the platooning shift map and a normal shift map and the difference between the platooning LU clutch switching map and the normal LU clutch switching map, if the shift control of the shift unit 64 or the control to switch the working state of the LU clutch 70 is performed immediately after the termination of the platoon joining control, the torque may be reduced at that time and then, a feeling of sluggishness may be induced when leaving the platoon. Thus, return to the normal controls is not made until the platoon participating vehicles 12 completely leaves the platoon. For example, in the case where the running state upon the termination of the platoon joining control at SV5 lies at point $P_{ca1}$ of FIG. 5, if the gear stage $G_{sh}$ at that time is the third gear stage, upshifting from $3^{rd}$ to $4^{th}$ is executed simultaneously with the return to the normal control, which may prevent the vehicle from smoothly leaving the platoon due to, e.g., the torque loss during shifting. Accordingly, in both the shift control and the switching control of the LU clutch 70, return to the normal controls is permitted only when meeting migration conditions that, e.g., the elapsed time or the running distance after leaving the platooning becomes equal to or greater than a predetermined value. Different migration conditions may be defined for the shift control and the switching control of the LU clutch 70.

The migration condition at SV6 may be such that the running state of the platoon participating vehicle 12 changes across the shift lines of the normal shift map of FIG. 5 for example, to wait the shift determination. For example, in the case where the running state of the platoon participating vehicle 12 changes from point $P_{ca1}$ through point $P_{ca2}$ to point $P_{ca3}$ with downshifting determination from $3^{rd}$ to $2^{nd}$, the normal shift control returns, allowing downshifting from $3^{rd}$ to $2^{nd}$. In the case where the running state of the platoon participating vehicle 12 changes from point $P_{ca1}$ to point $P_{ca2}$ and then again returns to point $P_{ca1}$ with upshifting determination from $3^{rd}$ to $4^{th}$, the normal shift control returns, allowing upshifting from $3^{rd}$ to $4^{th}$. That is, discomfort may occur to the driver if, during steady running that the running state of the platoon participating vehicle 12 remains $P_{ca1}$ for example, upshifting from $3^{rd}$ to $4^{th}$ is performed according to the migration condition that is based on, e.g., the lapse of time. However, shifting with change of running state does not cause the driver's discomfort.

Even when the vehicle is participating in platooning, the platoon joining control unit 140 executes protective shifting with priority over the shift command from the server 20 in accordance with a flowchart of FIG. 11. At SP1 of FIG. 11, it is determined whether there occurs a request for protective shifting. The protective shifting is, e.g., shifting for protecting the shift unit 64, etc. from rise in temperature of lubricant cooling them, or a shift for protecting the engine 32, the rotator MG, etc. as the driving force sources from overheating, etc., and is, e.g., upshifting for reducing the engine rotation number $N_o$ or the MG rotation number $N_{mg}$ to lessen the load on the engine 32 or the rotator MG. If determination at SP1 is affirmative, i.e., if a request occurs for protective shifting, the platoon joining control unit 140 executes the protective shifting of the shift unit 64 with priority over shifting based on the command from the server 20 at SP2, to send information of currently executing the protective shifting to the server 20 at SP3. In response to this, the server 20 excludes the platoon participating vehicle 12 currently executing the protective shifting from the targets of platoon shift control, to execute the platoon shift control for the other platoon participating vehicles 12 than the excluded platoon participating vehicle 12.

In this manner, in the platooning system 10 of the embodiment, shifting of the shift unit 64 is executed in order from the platoon participating vehicles 12 on the tail side (S5 to S7 of FIG. 7), among the platoon participating vehicles 12, and hence the shifting allows a margin in output control of the driving force sources (engine 32 and rotator MG) for the platoon participating vehicles 12 on the tail side, leading to higher driving force responsiveness, whereupon proper follow-up running becomes possible with the target intervehicle distance $D_t$ kept with respect to the preceding vehicle, consequently suppressing disturbance in the platoon when shifting the shift unit 64.

Since it is determined whether the shift conditions of the platooning shift map are satisfied, based on the running state (the demanded driving torque $T_{rdem}$ and the vehicle velocity V) of the leading vehicle 12*le* of the platoon participating vehicles 12, i.e., a vehicle having a greatest running air resistance and most quickly affected by, e.g., changes in the load surface gradient c (S4 and S5 of FIG. 7), the shift unit 64 of each of the platoon participating vehicles 12 is shifted rapidly correspondingly to the change in the demanded driving torque $T_{rdem}$, thus enabling both the driving force performance and the target intervehicle distance $D_t$ to be kept.

Since the platooning shift map is set so that shifting is performed at the same timing when the shift unit 64 of each of the platoon participating vehicles 12 has a different number of gear stages $G_{sh}$ (S3 of FIG. 7), there can be appropriately provided the effect of suppressing disturbance in the platoon arising from changes of the intervehicle distance $D_{is}$ caused by the difference in driving force responsiveness, by shifting the shift unit 64 in order from the platoon participating vehicles 12 on the tail side.

Although the platooning shift map used in platoon shift control is defined separately from the normal shift map for use in shift control separately performed by the shift control units 134 during the solo running, shifting by normal shift control is limited until the predefined migration conditions are satisfied (SV6 and SV7 of FIG. 10) after completion of the platoon shift control and before return to the normal shift control, and therefore shifting is performed at the same time when leaving the platoon after the completion of the platooning for example, suppressing the occurrence of a feeling of sluggishness.

Since in the case where the platoon participating vehicles 12 include a vehicle with a continuously variable transmission, application of the platoon shift control to the vehicle is excluded (SS1 and SS2 of FIG. 8), proper implementation of the platoon shift control can be ensured for the other platoon participating vehicles 12 each having a stepped shift unit 64.

Since in the case where the platoon participating vehicles 12 include a vehicle with a manual transmission, shifting under platoon shift control for the other platoon participating vehicles 12 each having the shift unit 64 is interrupted while the manual transmission is shifting (SS1 and SS2 of FIG. 8), proper implementation of the platoon shift control can be ensured irrespective of the presence of the platoon participating vehicle 12 with the manual transmission. That is, if while the manual transmission is shifting, platoon shift control is executed for the platoon participating vehicles 12 running anterior and posterior to the vehicle with the manual transmission, their respective driving force responsiveness may differ due to deviations in shift timing from the manual shifting, which may change the intervehicle distance $D_{is}$ and disturb the platoon. The platoon shift control is thus temporarily interrupted during shifting of the manual transmission.

Since in the case where protective shifting is requested that shifts the shift unit 64 for the purpose of protecting the platoon participating vehicles 12, the protective shifting is executed with priority over the platoon shift control effected by the server 20 (SP1 to SP3 of FIG. 11), the platoon participating vehicles 12 are properly protected by the protective shifting.

Since including the switching control putting the LU clutch 70 into the released state, the platoon lockup control is performed that switches the working state of the LU clutch 70 in order from the vehicles on the tail side among the platoon participating vehicles 12 (SL5 to SL7 of FIG. 9), upon switching to the released state of the LU clutch 70, the torque amplification effect by the torque converter 62 is obtained from the platoon participating vehicles 12 on the tail side. This allows a margin in output control of the driving force sources (engine 32 and rotator MG), leading to higher driving force responsiveness, whereupon proper follow-up running becomes possible with the target intervehicle distance $D_t$ kept with respect to the preceding vehicle, consequently suppressing disturbance in the platoon when switching the working state of the LU clutch 70. That is, if when switching the working state of the LU clutch 70 to the released state, the LU clutch 70 of the preceding vehicle is precedently released due to timing deviations, etc., the torque amplification effect by the torque converter 62 brings about a margin in output control of the driving force sources, leading to higher driving force responsiveness, whereupon delay occurs in the follow-up of the following vehicles having relatively low driving force responsiveness, resulting in increased intervehicle distance $D_{is}$, which may disturb the platoon.

Although the embodiment of the present invention has been described in detail hereinabove with reference to the drawings, this is merely one embodiment, and the present invention can be carried out in modes with various changes and alterations based on the knowledge of those skilled in the art.

EXPLANATIONS OF LETTERS OR NUMERALS

10: platooning system
12*le*: leading vehicle (platoon participating vehicle)
12*fo*-1, 12*fo*-2, 12*fo*-*n*: following vehicle (platoon participating vehicle)
20: server (platoon control device)
30: vehicle (platoon participating vehicle)
32: engine (driving force source)
62: torque converter
64: shift unit (automatic transmission)
70: LU clutch (lockup clutch)
130: in-vehicle control device
MG: rotator (driving force source)
$T_{rdem}$: demanded driving torque (drive demand amount)

The invention claimed is:

1. A platooning system for platoon participating vehicles including a leading vehicle and following vehicles executing automatic follow-up running in line with a predetermined intervehicle distance between adjacent vehicles from the leading vehicle,
the platoon participating vehicles each comprising a driving force source, an automatic transmission capable of shifting to a plurality of gear stages each having a different gear ratio, and an in-vehicle control device automatically controlling output of the driving force source and the gear stages of the automatic transmission,
the platooning system comprising a platoon control device connected via wireless communication to the platoon participating vehicles configured to operate at least shifting of the automatic transmission,
the platoon control device executing platoon shift control that shifts the automatic transmission of each of the platoon participating vehicles via the in-vehicle control device in order of a vehicle position from a tail side among the platoon participating vehicles in case of satisfying shift conditions defined in advance to allow the driving force source to work in a proper working range, and
after termination of the platoon shift control and return to normal shift control, the in-vehicle control device limits shifting executed under the normal shift control until predefined transition conditions are satisfied.

2. The platooning system of claim 1, wherein
the shift conditions used in the platoon shift control are defined based on running state including a drive demand amount, and wherein
the platoon control device determines whether the shift conditions are satisfied, based on the running state of the leading vehicle of the platoon participating vehicles.

3. The platooning system of claim 1, wherein
the platoon control device acquires transmission information related to the automatic transmission of each of the platoon participating vehicles, the platoon control device setting the shift conditions so that shifting is performed at a same timing even in case that the respective automatic transmissions have a different number of gear stages.

4. The platooning system of claim 1, wherein
the shift conditions used in the platoon shift control are defined separately from shift conditions used in the normal shift control that the respective in-vehicle control devices separately perform during solo running of the platoon participating vehicles.

5. The platooning system of claim 1, wherein
the platoon participating vehicles allow a vehicle with a continuously variable transmission to join the platoon participating vehicles as the following vehicle, and wherein
the platoon control device acquires transmission information related to the continuously variable transmission and, in case that the platoon participating vehicles include a vehicle with the continuously variable transmission, excludes application of the platoon shift control to the vehicle.

6. The platooning system of claim 1, wherein
the platoon participating vehicles allow a vehicle with a manual transmission to join the platoon participating vehicles as the following vehicle, and wherein
the platoon control device acquires transmission information related to the manual transmission and manual transmission information for determining whether the manual transmission is shifting and, in case that the platoon participating vehicles include a vehicle with the manual transmission, interrupts shifting under the platoon shift control of the platoon participating vehicle with the automatic transmission while the manual transmission is shifting.

7. The platooning system of claim 1, wherein
in case that protective shifting is requested that shifts the automatic transmission for protecting at least one of the platoon participating vehicles, the in-vehicle control device executes the protective shifting with priority over the platoon shift control effected by the platoon control device.

8. The platooning system of claim 1, wherein
the platoon participating vehicle each comprise a torque converter with a lockup clutch disposed between the driving force source and the automatic transmission, the in-vehicle control device automatically controlling working state of the lockup clutch, and wherein in case of satisfying predefined lockup clutch release conditions, the platoon control device executes, via the in-vehicle control device, platoon lockup control for switching the working state of the lockup clutch to released state in order from vehicles on tail side of the platoon participating vehicles.

* * * * *